Sept. 5, 1933.　　　F. A. WARD　　　1,925,740

INDEXING MECHANISM

Filed Dec. 29, 1930　　　4 Sheets-Sheet 1

INVENTOR
Frederick A. Ward
BY Whittemore Hulbert
Whittemore & Belknap
ATTORNEYS

Sept. 5, 1933.　　　　F. A. WARD　　　　1,925,740
INDEXING MECHANISM
Filed Dec. 29, 1930　　　4 Sheets-Sheet 2

INVENTOR
Frederick A. Ward
BY Whittemore Hulbert
Whittemore & Belknap
ATTORNEYS

Sept. 5, 1933.　　　　F. A. WARD　　　　1,925,740
INDEXING MECHANISM
Filed Dec. 29, 1930　　　4 Sheets-Sheet 3

INVENTOR
Frederick A. Ward
BY Whittemore Hulbert
Whittemore + Belknap
ATTORNEYS

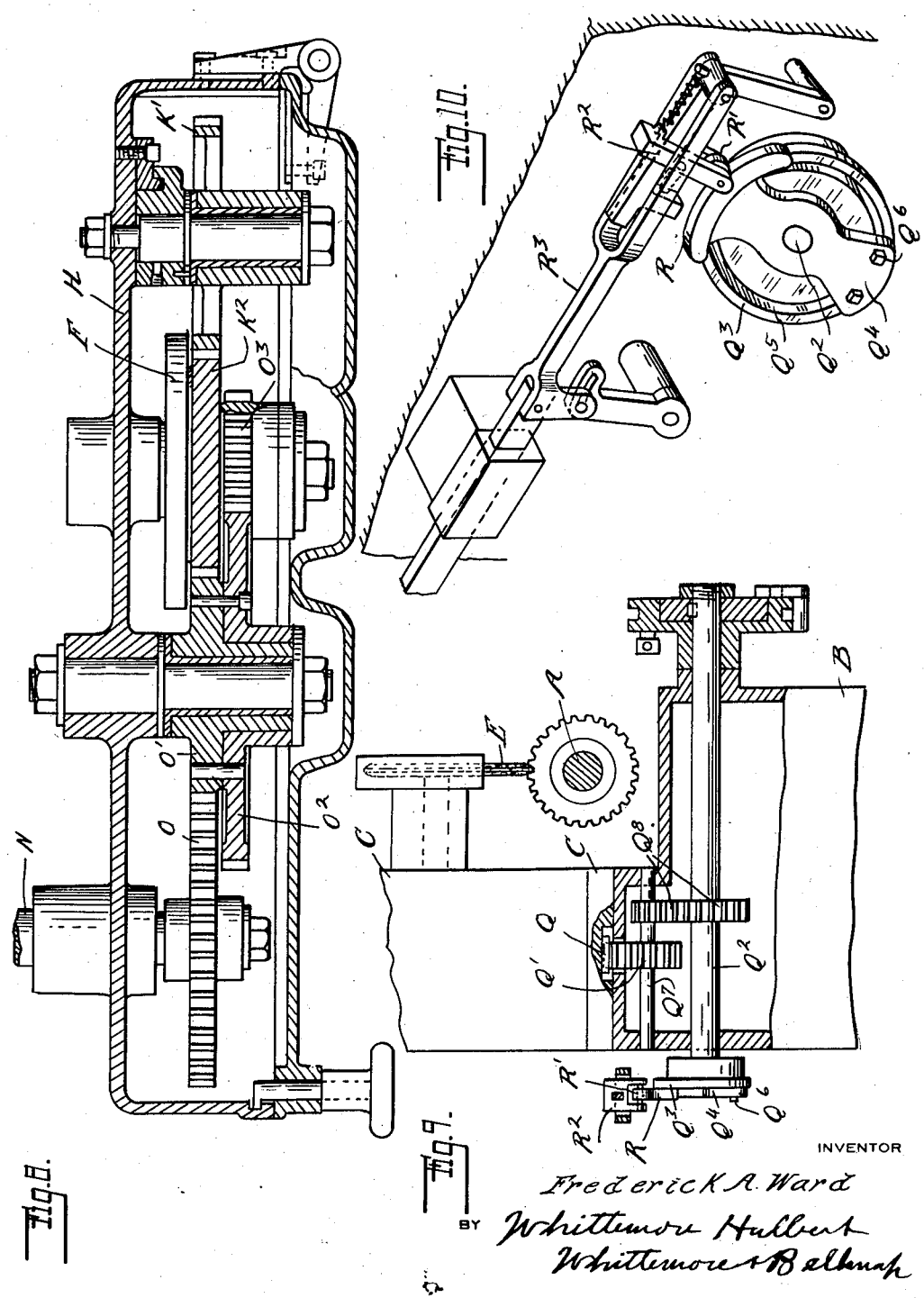

Patented Sept. 5, 1933

1,925,740

UNITED STATES PATENT OFFICE 1,925,740

INDEXING MECHANISM

Frederick A. Ward, Detroit, Mich., assignor to
The Gear Grinding Machine Company, Detroit,
Mich., a corporation of Michigan Application December 29, 1930
Serial No. 505,377

12 Claims. (Cl. 51—52)

The invention relates to indexing mechanism designed for use on machine tools of various constructions such for instance as gear grinding machines. It is the object of the invention First, to obtain a positive and rapid movement of the mechanism during operation;

Second, to avoid any shock or vibration due to the arresting of movement at the completion of the operation;

Third, to insure the release of the lock before movement is communicated to the mechanism;

Fourth, to gradually but positively re-engage the lock at the completion of the indexing movement.

With these and other minor objects in view, the invention consists in the construction as hereinafter set forth.

In the drawings:

Figure 8 is a horizontal section through the gear housing substantially on line 8—8 of Figure 6;

Figure 9 is a cross section substantially on line 9—9 of Figure 1; and Figure 10 is a perspective view of the motor valve actuating mechanism.

Figure 1:
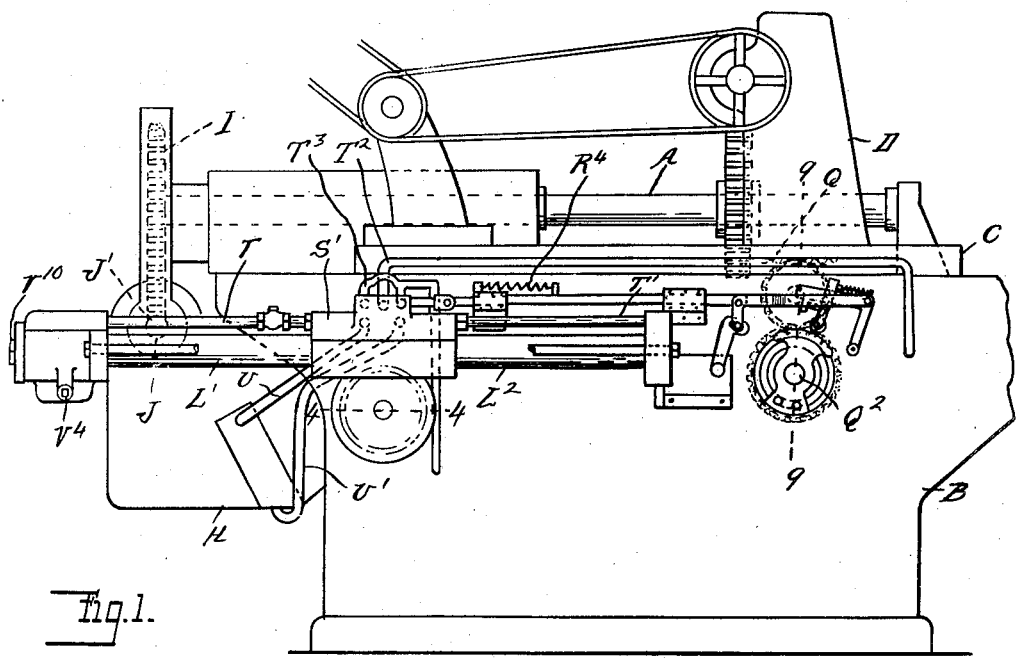
Figure 1 is an elevation of a gear grinding machine to which my improved indexing mechanism is applied.
Figure 2:
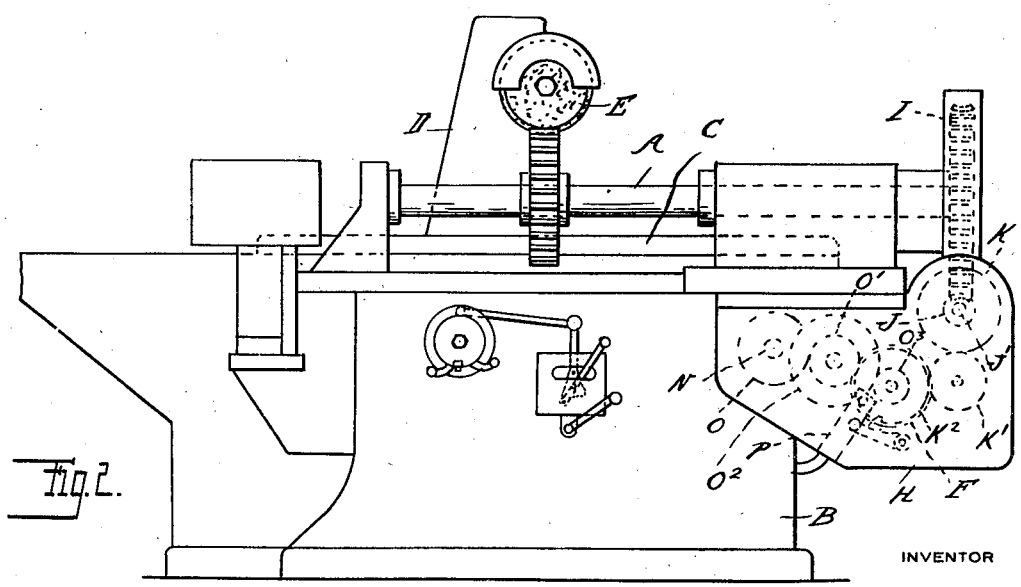
Figure 2 is an elevation of the reverse side of the machine.
Figure 7:
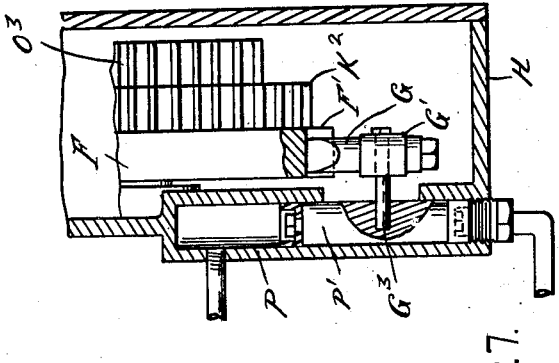
Figure 7 is a section on line 7—7 of Figure 6.
Figure 5:
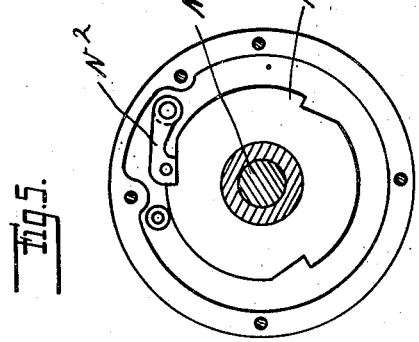
Figure 5 is an elevation of the ratchet wheel.
Figure 3:
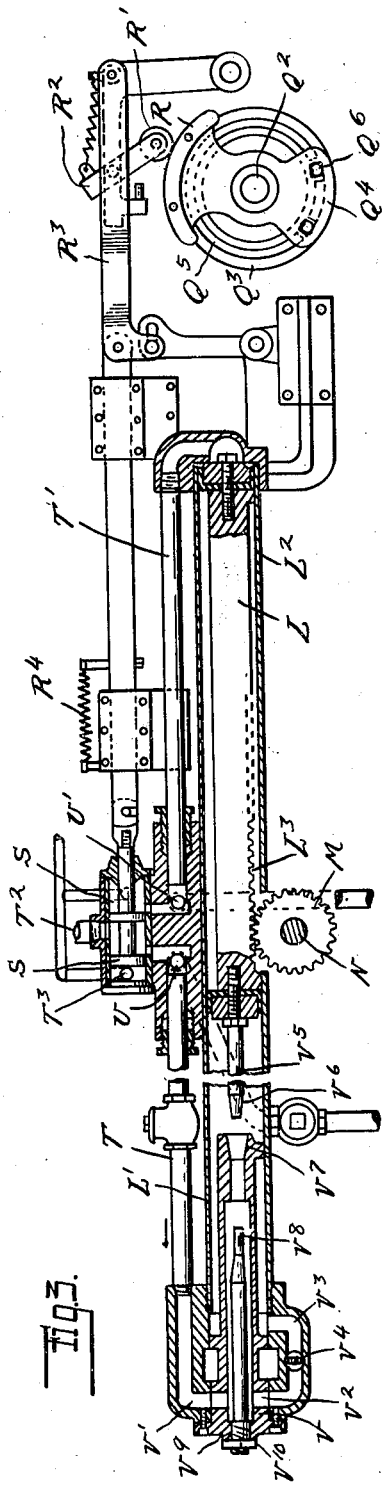
Figure 3 is a longitudinal section through the hydraulic motor showing the valve mechanism in elevation.
Figure 4:
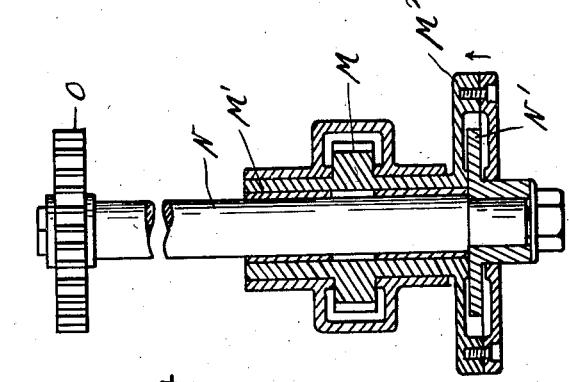
Figure 4 is a horizontal section substantially in the plane 4—4 of Figure 1.
Figure 6:
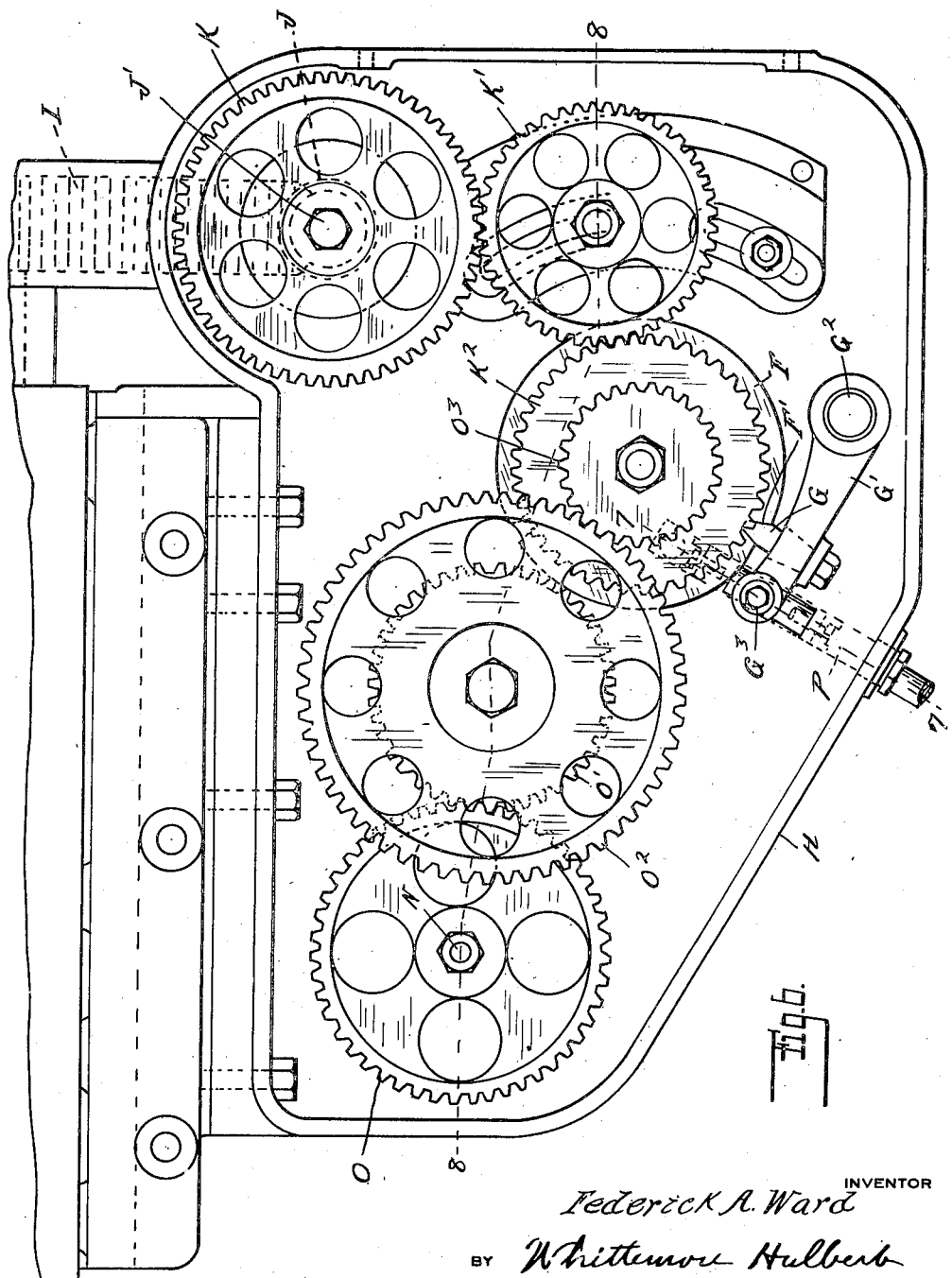
Figure 6 is a side elevation of the housing for the indexing gears with the cover removed.

In the construction of index mechanism it is quite usual to provide a disk or plate having a series of notches accurately positioned in the periphery thereof and which are successively engaged by a holding and locking dog. This plate is connected to the mechanism to be indexed either directly or through the medium of a change gear which permits of adjustment for various spacings. It is necessary, however, to provide means for releasing the locking dog and also means for rotating the index plate, these operations being performed in the interval between successive working periods of the machine which is indexed.

Inasmuch as the work producing capacity of any machine is limited by the time required for each indexing operation, it is highly desirable to perform this operation as quickly as possible. With large and heavy machines considerable power is required for the indexing movement and the momentum is such as to cause a considerable shock if suddenly arrested. I have therefore devised a construction of index mechanism in which the mechanism is actuated by a motor of sufficient power to quickly accomplish the desired movement. This motor is so controlled that it can not impart movement to the mechanism until the unlocking of the index plate is effected and provision is also made for gradually retarding the movement prior to its completion so as to overcome the inertia and to avoid the final shock.

As specifically shown my improved indexing mechanism is applied to a gear grinding machine in which A is the arbor carrying the gear to be ground and which is mounted on a stationary frame B. C is a carriage mounted for reciprocation on the bed B and having an upward extension D for carrying the grinder wheel E. As the specific construction of this gear grinding machine is not essential to the present invention, it will not be described in further detail.

The indexing mechanism comprises a rotary index plate F having one or more notches F' in the periphery thereof adapted to be engaged by a locking dog or detent G. This index plate together with the gearing for operating the same is preferably arranged in a housing H on one side of the stationary frame B in a convenient position for access when the gears are to be changed. The gear train between the work arbor A and the index plate includes a worm wheel I on the arbor which is in mesh with the worm J on a transverse shaft J' extending into the housing H. On the shaft J' is a change gear wheel K which through the medium of an idler gear K' is in driving connection with a gear wheel K² directly coupled to the index plate F.

The motor for actuating the indexing mechanism is preferably an hydraulic motor and preferably in the form of a double ended piston L engaging opposing cylinders L', L². Between these cylinders the piston L has a portion formed with a rack face L³ which intermeshes with a pinion M sleeved upon a shaft N. The motor and pinion M are preferably upon the opposite sides of the frame B from that on which the gear box L is mounted but the shaft N extends across this frame and into the gear box in which a gear wheel O is mounted upon said shaft. This gear wheel is connected by a gear train including the gear wheels O', O² and O³ with the index plate and gear wheel K².

As the piston L is actuated to reciprocate in the cylinders L' and L², the rack L³ will impart an oscillatory movement to the pinion M which is rotated first in one direction and then in the reverse direction. This oscillatory movement is changed to movement in one direction only, through the medium of a ratchet mechanism which is intermediate the pinion M and shaft N. As shown, the pinion M is mounted on a sleeve M' surrounding the shaft N, which sleeve carries a housing M² for a ratchet wheel N' secured to said shaft. A pawl N² on the housing M² engages notches in the periphery of the ratchet wheel thereby communicating the rotation of the pinion M to the shaft N when revolving in one direction, but permitting the shaft to remain stationary during the reverse rotation of the pinion. Thus whenever the piston L is moved in one direction it will through the medium of the pinion M and ratchet wheel N' communicate rotary motion to the shaft N and from the latter through the gear train O, O', O², O³ to the index plate F. The same movement will through the medium of the gear train K², K', K, and shaft J', worm J and worm wheel I communicate rotary motion to the arbor A on which the work is mounted.

As has been stated, the index plate F is normally held in locked position by a locking dog or detent G. This is preferably of wedge shape, engaging a corresponding wedge shaped notch F' in the periphery of the index plate so as to take up all lost motion and to hold the plate rigidly in position. The detent G is secured to a rock arm G' pivoted on the pin G² within the casing H. This rock arm is actuated towards and from locking position by a hydraulic motor comprising a cylinder P preferably integral with the casing H and containing a piston P'. The central portion of the cylinder P is slotted to permit the passage of a pin G³ on the rock arm G' into engagement with a notch in the piston, the arrangement being such that when the piston is reciprocated a corresponding rocking movement is imparted thereby to the arm G'. The opposite ends of the cylinder P are alternately connected to a source of fluid under pressure and with an exhaust to effect the reciprocation of the piston, this being controlled by means hereinafter described.

The timing of the operation of the index mechanism is effected through the movement of the table C after the grinder wheel has traversed the work and has disengaged therefrom and before its return movement. The mechanism for accomplishing this includes a rack member Q secured to the travelling table and which intermeshes with a pinion Q' on a shaft Q⁷ connected by intermeshing gear wheels Q⁸ with a shaft Q² journaled in the frame and extending transversely thereof. At the outer end of the shaft Q² and on the same side of the frame as the cylinders L', L² is a rotary head Q³ to which is adjustably secured a cam carrier Q⁴. This adjustment is preferably effected by providing an annular under-cut slot Q⁵ in the head Q³ engaged by headed clamping bolts Q⁶ on the cam carrier. The cam carrier Q⁴ has mounted thereon exchangeable cams R. These are fashioned to engage a latch roller R' on a bell crank lever R² mounted on the frame B to impart a timed rocking movement to said lever. The bell crank lever R² is connected by a rod R³ with a valve S which controls the admission of fluid to the hydraulic motor. This valve is shown in the form of a piston valve arranged in a cylinder S' having ports therein connected with conduits T and T' leading to the ends of the opposed cylinders L' and L². The cylinder S' has also connected thereto the supply conduit T² for the fluid under pressure and an exhaust conduit T³, the arrangement being such that when the valve S is moved towards one end of the cylinder it will connect the pressure fluid with the conduit T and the exhaust with the conduit T' while the movement of the valve to the opposite end of the cylinder will reverse these connections supplying the pressure fluid to the conduit T' and exhaust to the conduit T. The conduits T and T' are further connected with conduits U and U' which lead to the opposite ends of the cylinder P.

With the construction as thus far described, the operation of the indexing mechanism is as follows:

When the table C has carried the grinder wheel out of engagement with the work then the cam R actuated by the rack Q and pinion Q', Gear Q⁷, and shaft Q² and head Q³ will lift the latch roller R' on the bell crank lever R², rocking said lever and through the connecting rod R³ shifting the valve S so as to connect the conduit T' with the pressure fluid and the conduit T with the exhaust. The pressure in the conduit T' will be communicated through the conduit U' to one end of the cylinder P and as the inertia of the piston P' is less than the inertia of the piston L and the mechanism connected therewith, said piston P will be first actuated. This through the medium of the pin G³ will rock the arm G' so as to withdraw the detent G from the notch F' permitting the index plate F to be revolved. The pressure fluid passing through the conduit T' to the cylinder L² will then actuate the piston L in the direction of the arrow rotating the pinion M and through the pawl N² communicating this rotation to the ratchet wheel N' on the shaft N. This in turn will drive the gear train O, O', O², O³ and communicate rotary movement to the index plate F. The movement will continue until the piston L contacts with a stop as will be hereinafter explained which arrests further movement thereof. All this occurs while the roller R' on the bell crank lever R² is still lifted by the cam R, but in the further movement of the table C said roller disengages from said cam which permits the reverse movement of the connecting rod R³ under the actuation of a spring R⁴ and the consequent reversal of the position of the valve S to connect the conduit T with the exhaust and the conduit T' with the pressure fluid. The first effect of this reversal is to send pressure fluid through the conduit U to the cylinder P moving the piston P' in the reverse direction and rocking the arm G' so as to engage the detent G with the locking notch F', thereby locking the indexing mechanism. Following this the pressure of the fluid on the reverse end of the piston L will move said piston in the opposite direction, communicating this movement to the pinion M but on account of the ratchet connection, the shaft N is not actuated.

To produce an accurate indexing, the distance traveled by the piston L must be exactly predetermined. This is accomplished by providing an adjustable stop at the end of the cylinder L' for contacting with the piston L and arresting movement thereof. If, however, the movement of the piston were arrested while traveling at its normal velocity, the shock due to the inertia of the moving parts would be very great and would produce detrimental results. Therefore I have provided a cushioning means for gradually decelerating the piston before contacting with the stop, the arrangement being as follows:

At the end of the cylinder L' is a detachable head V which has a tubular portion projecting inward into the cylinder. The conduit T connects through a port V' with the chamber within this tubular portion while a second port $V^2$ connects with a by-pass $V^3$ communicating with a cylinder outside of said tubular portion. In the by-pass $V^3$ is an adjustable valve $V^4$ by means of which the passage for the fluid may be restricted to any desired extent. The piston L has secured to its end a projecting pin or stud $V^5$ which has a tapered end portion $V^6$. The tubular portion V has at its inner end an orifice which substantially fits the stud $V^5$ but with a flaring entrance $V^7$ to this orifice. A suitable pin or stud $V^8$ extends centrally through the tubular portion but is provided with a threaded shank $V^9$ engaging a correspondingly threaded aperture in the head V and secured in this position of adjustment by a lock nut $V^{10}$.

With the construction just described when the piston L nears the end of its indexing movement the tapering end portion $V^6$ of the stud $V^5$ will enter the flaring aperture $V^7$ at the end of the inwardly projecting tube, thereby restricting the flow of fluid propelled by the piston towards the exhaust conduit T'. In the further movement of the piston the restriction will be progressively increased until the cylindrical portion of the stud $V^5$ enters the correspondingly sized aperture producing practically a seal. However, the fluid propelled by the piston still has the path of escape through the by-pass $V^3$ and restricted passage formed by the valve $V^4$ but the restriction is so great that the movement of the piston will be very slow. Thus when the stud $V^5$ contacts with the stop $V^8$ the velocity is so low that the shock of stopping is negligible. Thus the piston may be permitted to travel at a very high rate of speed during the greater portion of its movement, thereby driving the gear train at a corresponding speed and rapidly shifting the work from one index position to another. However, in the final portion of the indexing movement the velocity of the piston is gradually decelerated and the inertia both of the piston and the connected mechanism is overcome before the final contact with the arresting stop.

One of the important advantages of my improved construction is that the indexing member may be made of small diameter and nevertheless can be used for indexing any number of points or divisions in the cycle of the work. Also it will produce a very accurate indexing, for errors in the spacing between adjacent indexing notches are minimized by the number of revolutions of the indexing member during the movement of the indexing train. To produce still further accuracy the stop $V^8$ is so adjusted that it will arrest movement of the piston slightly before a completion of the full indexing movement of the indexing plate F. The final completion of this movement is therefore effected by the engagement of the locking dog or detent G which being wedge-shaped, will enter the notch V' and then force the plate F to its final position.

What I claim as my invention is:

1. An indexing mechanism comprising a lockable revoluble index member, a gear train between said member and the work to be indexed, a motor for driving said gear train positively connected therewith for imparting movement in one direction, a stop for limiting and arresting movement of said motor and train, and means operable in advance of the movement of and the stopping of said train for respectively unlocking and locking said index member.

2. An index mechanism comprising a revoluble index member, means engageable with said index member to lock the same from movement, a step-up gear train between the work to be indexed and said index member, a motor for driving said train positively connected therewith for imparting movement in one direction, means for starting and stopping said motor, and means operable by said starting and stopping for respectively unlocking and locking said index member.

3. An indexing mechanism comprising a revoluble index member, means for locking said member, a step-up gear train between the work to be indexed and said indexing member, a motor for driving said train positively connected therewith for imparting movement in one direction, a stop for arresting movement of said motor, means cooperating with said motor for unlocking said index member in advance of the imparting of movement to said train, means for retarding movement of said motor and train prior to the stopping thereof and means for relocking said index member.

4. An indexing mechanism comprising a revoluble index member, means for locking the same, a step-up gear train between the work to be indexed and said index member, a motor for driving said train positively connected therewith for imparting movement in one direction, means cooperating with said motor for unlocking said index member in advance of the imparting of movement to said train, a stop for arresting movement of said motor slightly in advance of the completion of the indexing movement, and means for relocking said index member adapted to complete the indexing movement thereof.

5. An indexing mechanism comprising a revoluble index member, means for locking said member, a step-up gear train between the work to be indexed and said index member, a reciprocating motor, connecting means between said motor and gear train for positively actuating the latter by a movement of the motor in one direction while permitting the free reverse movement of said motor, means for disengaging said index locking means in advance of imparting movement to said train, a stop for arresting movement of the motor slightly in advance of the completion of the indexing movement of said index member, and means for relocking said index member adapted to complete the indexing movement thereof.

6. An indexing mechanism comprising a revoluble index member, means for locking said member, a step-up gear train between the work to be indexed and said index member, a reciprocating fluid actuated motor comprising a cylinder, a piston in said cylinder, means controlling the admission and exhausting of fluid alternately at opposite ends of said cylinder to cause a reciprocation of said piston, a rack bar actuated by said piston, a gear train driven by said rack bar for positively rotating said revoluble index member in one direction, a ratchet in said gear train permitting the return reciprocation of said piston without movement of said index member, means actuated by the fluid pressure which moves the piston for disengaging said index locking means in advance of the imparting of movement to said train, a stop for arresting said piston at the completion of the index driving movement, and means actuated by the fluid pressure which returns said piston for re-engaging said index locking means.

7. An indexing mechanism comprising a revoluble indexing member, a reciprocating motor for positively revolving said index mechanism in one direction, an adjustable stop for arresting movement of said reciprocating motor at a predetermined point to accurately limit the movement imparted to said index member and means permitting return of said motor without movement of said index means.

8. An indexing mechanism comprising a revoluble index member, a hydraulic cylinder, a piston in said cylinder, a rack bar actuated by said piston, a gear train between said rack bar and said index member for positively rotating the latter in one direction, means in said gear train permitting return movement of said piston and rack bar without movement of said index member and an adjustable stop for limiting movement of said piston to accurately limit the movement of said index member.

9. An indexing mechanism comprising a revoluble index member, a locking means therefor, an hydraulic cylinder, a piston in said cylinder, means controlling admission and exhausting of fluid alternately at opposite ends of said cylinder to reciprocate said piston, a rack bar actuated by said piston, a gear train actuated by said rack bar for rotating said index member in one direction, means permitting the reverse movement of said rack bar without movement of said index member, means actuated by the fluid pressure operating upon opposite ends of said piston for releasing said locking means in advance of movement of the piston to actuate said index and for re-engaging said locking means upon completion of said movement of the piston.

10. The combination with a work holder and a reciprocating member for successively presenting an operating means to work to be operated upon in said work holder, of means for indexing the work holder intermediate said operations comprising a revoluble index member, locking means therefor, a step-up gear train between the work to be indexed and said index member, a motor for positively rotating said index means controlled by said reciprocating member to operate during the period when the work is withdrawn from said operating means, and means for releasing and re-engaging said locking means respectively in advance of movement of said index means and at the completion thereof.

11. The combination with a work holder and a reciprocating member for presenting an operating means to work to be operated upon in said work holder, said reciprocating member having a slight over-movement as said operating means is withdrawn from the work, of indexing mechanism for the work holder comprising an index member, locking means therefor, a step-up gear train between the work to be indexed and said index member, a motor for positively actuating said index member, means controlling said motor causing the actuation of the same during the interval in which the work is withdrawn from said operating means, a stop for limiting movement of said motor, means for retarding said motor in advance of engagement with said stop, and means for disengaging and re-engaging said locking means respectively in advance of the movement of said motor and upon the arrest of the same by said stop.

12. An indexing mechanism comprising a revoluble index member, a locking means therefor, an hydraulic cylinder, a piston in said cylinder, a rack bar actuated by said piston, a gear train between said rack bar and said index member for positively rotating the latter in one direction, means in said gear train permitting return movement of said piston and rack bar without movement of said index member, an adjustable stop for limiting movement of said piston to accurately determine the movement of said index member, and means operating before and subsequent to the movement of said index member for respectively disengaging and re-engaging said locking means.

FREDERICK A. WARD.